United States Patent [19]

Hostettler et al.

[11] 3,957,753

[45] May 18, 1976

[54] LIQUID HYDROXY-TERMINATED POLYESTERS

[75] Inventors: Fritz Hostettler, Verona; William H. Cook, Upper Montclair, both of N.J.; Frank G. Lombardi, Manchester, Conn.

[73] Assignee: Inter-Polymer Corporation, Farmingdale, N.J.

[22] Filed: May 22, 1974

[21] Appl. No.: 472,289

Related U.S. Application Data

[63] Continuation of Ser. No. 760,362, Sept. 17, 1968, abandoned, which is a continuation-in-part of Ser. No. 715,139, March 22, 1968, abandoned.

[52] U.S. Cl. .................... 260/210 R; 260/2.5 AN; 260/31.6; 260/75 NH; 260/75 NK; 260/75 NP; 260/484 A; 260/75 NQ
[51] Int. Cl.² ........................................ C07C 69/66
[58] Field of Search .................... 260/484 A, 210 R

[56] References Cited
UNITED STATES PATENTS

| | | | |
|---|---|---|---|
| 2,990,379 | 6/1961 | Young et al. | 260/485 |
| 3,169,945 | 2/1965 | Hostettler et al. | 260/485 |
| 3,186,971 | 6/1965 | Hostettler et al. | 260/485 |

*Primary Examiner*—Jane S. Myers
*Attorney, Agent, or Firm*—Watson Leavenworth Kelton & Taggart

[57] ABSTRACT

Solid and microcellular polyurethane elastomers prepared by reacting (a) liquid polyesters containing from about 25 percent by weight to about 70 percent by weight of the epsilon-oxycaproyl unit, the balance of the polyester being derived from the reaction of at least one dicarboxylic acid with at least two glycols selected from the group consisting of ethylene glycol 1,3-propanediol, 1,4-butanediol and 1,5-pentanediol, (b) an organic polyisocyanate, and optionally (c) a chain-extender comprising water, glycols, amino alcohols, or diamines. If the liquid polyester (a) is branched, for example, by addition of small quantities of a triol, the reaction with the organic polyisocyanate may be conducted in the absence of a chain-extender. Processes for producing these elastomers are also disclosed.

Novel liquid, substantially primary hydroxyl-terminated, linear and branched polyesters containing from about 25 percent by weight to as much as about 70 percent by weight of the epsilonoxycaproyl unit

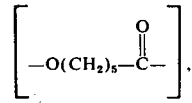

the balance of the polyester being derived from the reaction of at least one dicarboxylic acid with at least two straight chain glycols selected from the group consisting of ethylene glycol, 1,3-propanediol, 1,4-butanediol and 1,5-pentanediol. These polyesters have a true melting point no higher than about 30°C. Also provided are processes for producing these polyesters.

5 Claims, No Drawings

LIQUID HYDROXY-TERMINATED POLYESTERS

CROSS-REFERENCES TO RELATED APPLICATIONS

This application is a continuation of application Ser. No. 760,362, filed Sept. 17, 1968, now abandoned, which is a continuation-in-part of our copending application Ser. No. 715,139, filed Mar. 22, 1968, now abandoned, the disclosure of which is incorporated herein by reference.

BACKGROUND OF THE INVENTION

1. Field of the Invention

This invention relates to the manufacture of solid and microcellular polyurethane elastomers, the manufacturing improvement comprising the use of essentially liquid polyesters having a "true melting point" of no higher than about 30°C.; said polyesters comprising products containing from about 25 percent by weight to about 70 percent by weight of the epsilon-oxycaproyl unit, and said polyurethanes being characterized by high strength and exceptional resistance toward humidity at elevated temperatures.

This invention further relates to novel liquid polyesters and to processes for their manufacture, which polyesters comprise liquid, substantially hydroxyl-terminated polyesters containing from about 25 percent by weight to about 70 percent by weight of the epsilon-oxycaproyl unit, the balance of the polyester being derived from the reaction of at least one dicarboxylic acid with at least two straight chain glycols selected from the group consisting of ethylene glycol, 1,3-propanediol, 1,4-butanediol and 1,5-pentanediol, said polyesters having a true melting point of no higher than about 30°C.

The liquid polyesters of the present invention are eminently suitable as plasticizers for vinyl resins and as intermediates for the novel polyurethanes possessing improved physical characteristics.

2. DESCRIPTION OF THE PRIOR ART

It is well known that polyesters derived from epsilon-caprolactone are useful for the manufacture of high performance polyurethane elastomers. Polyesters of this type are described for example, in U.S. Pat. No. 3,169,945, with corresponding elastomers being described in U.S. Pat. No. 2,933,478. Unfortunately, however, the majority of the polyesters derived from epsilon-caprolactone are waxy solids melting at temperatures of from 50° to about 60°C. This relatively high melting point thus makes them unsuitable for many applications where a liquid polyester product is required as a starting material, as for example in the manufacture of microcellular elastomers by the "one-shot" technique, or in the manufacture of liquid cast printing ink rollers, and the like.

It is also known that the epsilon-oxycaproyl unit is capable of imparting to a polyester or a polyurethane elastomer, containing substantial portions of said unit, enhanced resistance toward hydrolysis or hydrolytic breakdown due to exposure to moist atmosphere. While the polyester products described in U.S. Pat. No. 2,933,478 are indeed much superior with regard to hydrolytic stability when compared with conventional adipate polyesters derived, for example, from adipic acid and ethylene glycol or 1,4-butanediol, they are unfortunately relatively high-melting products which limits their usefulness for the above-noted applications as well as other areas where a low melting polyester product is required.

It has been shown in the prior art that relatively low-melting liquid polyester products containing a substantial proportion of the epsilon-oxycaproyl unit may be prepared by copolymerizing epsilon-caprolactone and lower alkyl-substituted epsilon-caprolactones, or by copolymerizing epsilon-caprolactone (or a lower alkyl-substituted epsilon-caprolactone or mixtures thereof) with a dicarboxylic acid and a glycol containing one or more alkyl substituents such as propylene glycol, 1,3-butylene glycol, and the like. Such products are described, for example, in U.S. Pat. Nos. 2,933,477 and 3,139,945. However, introduction of alkyl substituents or terminal secondary hydroxyl groups into the polyester chain has been shown to result in a decrease in the strength characteristics of polyurethane elastomers derived from this type of polyester.

Consequently, there exists a definite need in the art for liquid and/or low melting hydroxyl-terminated polyester products containing a substantial portion of the epsilon-oxycaproyl unit in order to have available useful high-performance polyurethane elastomer intermediates which lend themselves to the manufacture of superior performing urethane elastomers exhibiting not only exceptional strength and toughness, but also superior resistance toward the influence of moist atmosphere at elevated temperatures.

It is further known that polyesters derived from dicarboxylic acids and glycols or polyesters from epsilon-caprolactone can be utilized for the manufacture of a variety of polyurethane elastomers and for the manufacture of microcellular urethane elastomers. However, polyesters of the prior art which will result in the optimum properties of high strength and other desirable characteristics are relatively high melting waxy solids at room temperature, which limits their usefulness in many applications. A typical product which is in prominent use for the manufacture of polyurethane elastomers is the hydroxyl-terminated polyester derived from adipic acid and ethylene glycol, having a molecular weight of about 2000, and melting at a temperature of about 50–55° C. Another typical product utilized in the manufacture of urethane elastomers is the homopolymer of epsiloncaprolactone initiated with a glycol, and having a molecular weight of about 2000. This product is a waxy solid melting at about 60° C.

When the above polyester products of the prior art are employed in the manufacture of microcellular urethane elastomers, for example, they must first be converted to a prepolymer of an organic polyisocyanate before they can be handled satisfactorily in present processing equipment. Due to the high melting points of these polyesters, it is impractical to mix them with the organic polyisocyanate and the water required to generate the carbon dioxide in the formation of the microcellular elastomer by the so-called "one-shot" technique, since at the relatively high temperatures required to convert these polyester products to liquids, reaction rates in the "one-shot" technique become too rapid to be practical. Consequently, there exists in the art a definite need for polyester products which are essentially liquid at much lower temperatures and yet yield polyurethane products exhibiting similar strength characteristics to those observed with the above-mentioned polyethylene adipates and poly-epsilon-caprolactones.

3

Still a further area where the use of liquid or very low melting polyesters is of particular importance in the manufacture of urethane elastomers is in liquid cast systems, both from the point of view of the "prepolymer" technique as well as the "one-shot" technique. Liquid polyesters lead generally to liquid prepolymers upon reaction with organic diisocyanates. Liquid prepolymer products lend themselves to much more readily adaptable processing techniques than solid prepolymers. Moreover, liquid polyester products are admirably suited to the adaptation of the so-called "one-shot" technique for the formation of cast urethane elastomers. It must be noted in this regard that the polyactone-derived elastomer products have a distinct advantage over the adipic acid-derived products in that the high epsilon-oxycaproyl content of the former contributes to very substantially improved hydrolytic stability. In fact, it has been shown [Magnus et al., Rubber Chem. & Techn. 39 1328(1966] that they are as good as polyether elastomers in this respect. Consequently, there is in the field of cast urethane elastomers a definite need for novel liquid or very low melting polyesters capable of being converted to elastomers of excellent strength and having other excellent characteristics.

Still another method for the manfacture of liquid polyester products comprises reacting dicarboxylic acids with glycols which contain ether groups, for example, diethylene glycol. These urethane elastomers, however, suffer not only from decreased tensile strength, but also from decreased resistance toward humid ageing.

It is also known from the prior art that the introduction of a substantial portion of the known epsilon-oxycaproyl unit into a polyurethane elastomer provides products of excellent strength characteristics as well as products exhibiting superior humid ageing characteristics over the elastomer products derived from polyesters of conventional dicarboxylic acids and glycols. Unfortunately, however, polylactones derived from epsilon-caprolactone, hence containing the epsilon-oxycaproyl unit, show a very severe tendency to crystallize. They are even worse in this respect than polyesters obtained from dicarboxylic acids and glycols, for example, from adipic acid and alkanediols.

Consequently, there exists a distinct need in the art for liquid polyesters and the resulting polyurethanes which provide the physical characteristics outlined above.

SUMMARY OF THE INVENTION

It is accordingly one object of the present invention to provide novel, solid and microcellular polyurethane elastomers of excellent strength and resistance toward the influence of moisture at elevated temperatures.

A further object of the invention is the provision of novel, liquid, substantially primary hydroxyl-terminated polyesters which have a maximum true melting point above about 30° C., which polyesters are eminently suitable for the manufacture of the above polyurethanes.

Another object of the invention resides in the provision of liquid polyesters containing from about 25 percent by weight to about 70 percent by weight of the epsilon-oxycaproyl unit.

A still further object of the invention is to provide processes for the production of these polyurethanes and the intermediate liquid polyesters.

Other objects and advantages of the present invention will become apparent as the description thereof proceeds.

In satisfaction of the foregoing objects and advantages, there are provided by this invention novel solid and microcellular polyurethane elastomers of excellent strength and resistance toward the influence of moisture at elevated temperatures by the reaction of (a) a liquid polyester having a true melting point of below about 30°C. and containing from about 25 percent by weight to about 70 percent by weight of the epsilon-oxycaproyl unit, the balance being derived from the reaction product of a dicarboxylic acid, and at least two glycols selected from those of the formula $HO(CH_2)_nOH$, wherein n is an integer from 2 to 5, (b) an organic polyisocyanate, and (c) a chain-extender selected from the group consisting of water, glycols and higher polyols, amino alcohols, and diamines.

There are also provided by this invention novel liquid, substantially hydroxyl-terminated, polyesters containing from 25 percent by weight to about 70 percent by weight of the epsilon-oxycaproyl unit, the balance of the polyester segment being the reaction product of at least one dicarboxylic acid, with at least two additional glycols selected from the group consisting of ethylene glycol, 1,3-propanediol, 1,4-butanediol and 1,5-pentanediol. The epsilon-oxycaproyl unit is derived from epsilon-caprolactone and/or 6-hydroxycaproic acid and its lower oligomers. The polyesters of this invention possess a true melting point of below about 30°C. and thus are eminently suitable for use in preparing the above-mentioned polyurethanes as well as plasticizers for vinyl resins.

In accordance with the present invention, it has been found that the above-described procedures result in the production of liquid polyesters or polyesters having a maximum true melting point no higher than about 30°C., the polyesters being eminently suitable for the manufacture of polyurethane elastomers, microcellular elastomers, and the like which possess outstanding strength and resistance toward humig aging. A second and equally important aspect of the invention resides in a process for the manufacture of the above liquid polyesters as well we processes for preparation of the polyurethanes.

In the manufacture of the polyester intermediates a mixture consisting of from about 25% by weight of epsilon-caprolactone to about 70% by weight of epsilon-caprolactone (or alternatively about 30% by weight to about 80% by weight of 6-hydroxycaproic acid and its lower oligomers), at least one dicarboxylic acid, and at least two glycols selected from the group consisting of ethylene glycol, 1,3-propanediol, 1,4-butanediol and 1,5-pentanediol are reacted at a temperature from about 100°C. to as high as 300°C., preferably from 100° to about 250°C., if desired in the presence of a catalyst, to form a substantially hydroxylterminated polyester having a hydroxyl equivalent weight of from 250 to about 1500.

As stated previously, it is also within the scope of the present invention to utilize a mixture of 6-hydroxycaproic acid and its lower oligomers in addition to or in place of the epsilon-caprolactone monomer described above. Various methods of preparation of 6-hydroxycaproic acid and such oligomers are further described in copending U.S. application Ser. Nos. 715,139 and 715,164, both filed on Mar. 22, 1968, both now abandoned.

During the above-described condensation reaction, water, which is formed as a by-product of reaction, or water which may be present in the 6-hydroxycaproic acid oligomer mixture, may be removed by azeotropic distillation with a suitable hydrocarbon such as benzene, toluene, ethylbenzene, xylene, and the like, or it may be removed by distillation at atmospheric or reduced pressure, or by a combination of both methods, as either has been found suitable.

The polyesters produced in the process of the present invention must possess a "true melting point" of no more than about 30°C. The "true melting point" is determined by subjecting a sample of the polyester to a sufficiently low temperature to effect essentially complete crystallization of the sample. A small sample of the polyester is then placed in an apparatus suitable for determining the melting point of the product. The sample is than submerged in a liquid which is heated at the rate 0.5°C per minute until a high enough temperature is reached to completely melt the polyester sample. This melting range, which may be very distinct over a range of ±1°C., or slightly more, is considered the "true melting point" of the polyester. As stated hereinabove, the "true melting point" of the polyesters of this invention shall not exceed the value of about 30°C.

In actual practice it has been observed that even though a liquid polyester of the present invention may have a "true melting point" of from 27° – 30°C. for example, the product may remain liquid at a temperature of 25°C. for many months before it finally crystallizes at this temperature. For this reason, we are defining as "liquid polyesters" those products having "true melting points" not exceeding about 30°C.

The polyesters of the present invention must possess an epsilon-oxycaproyl unit

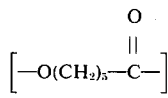

content of from 25% by weight to about 70% by weight for the reasons set forth hereinafter. The upper figure, namely the 70% by weight content of the epsilon-oxycaproyl unit, corresponds generally to the approximate upper limit wherein the polyester products of the present invention have a "true melting point" not exceeding about 30°C. The lower figure, namely the 25% by weight content of the epsilon-oxycaproyl unit, is approximately the minimum desired amount of epsilon-oxycaproyl units necessary to substantially distinguish the hydrolytic stability of the polyesters of the present invention, as well as their urethane elastomer derivatives, from the hydrolytic stability characteristics of prior art products. Within this range of epsilon-oxycaproyl unit content, a still more highly preferred range is from about 45% by weight to about 70% by weight, since the higher the epsilon-oxycaproyl content of the liquid polyester products of the present invention, the better their hydrolytic stability and the better the resistance toward humid aging of the corresponding urethane elastomer and microcellular elastomer products.

In the manufacture of the novel polyesters of the present invention, at least one dicarboxylic acid selected from the group of adipic acid, succinic acid, glutaric acid (or their anhydrides), sebacic acid, pimelic acid, and azelaic acid is employed. Adipic acid, either singly or in combination with one or more of the other dicarboxylic acids or anhydrides is highly preferred as it is readily available and provides good products.

In the manufacture of the polyesters of the present invention the proper selection of the alkanediols to be used is highly critical since the random disorder which is brought about by their introduction into the polymester chain is, to a large extent, responsible for the observed "true melting point" of the resultng polyester. Generally speaking, if only one glycol is employed, oftentimes a relatively high melting polyester, outside the scope of the present invention will result. This is particularly true for the desirable higher epsilon-oxycaproyl unit contents. Surprisingly, it has now been found that the utilization of at least two glycols of those of the formula $HO(CH_2)_nOH$, where n is an integer of 2 to 5, and which are of the group consisting of ethylene glycol, 1,3-propanediol, 1,4-butanediol and 1,5-pentanediol, in combination with the aforementioned comonomers already described, yields the desired result of a liquid polyester product havine a "true melting point" not exceeding about 30°C. Optimum selection of the relative molar concentration of the two alkanediols listed hereinabove has been found to be near the molar ratio of 1 with respect to the two alkanediols involved, since this will generally lead to the most pronounced disruption of the polyester chain. However, substantial departures from the above molar ratio, for example, from about 3 or more to about ⅓ or less are also within the scope of this invention.

It should be pointed out, to further illustrate the criticality of the selection of alkanediols, that 1,6-hexanediol and 1,10-decamethylene glycol, in combination with ethylene glycol for example, does not lead to the desired result, or that a combination of 1,4-butanediol and 1,6-hexanediol at a molar ratio of 1 does not lead to the liquid polyester products of the present invention. Accordingly, it is clear that there must be employed at least two glycols from the above group to obtain the desired results of a good liquid polyester.

It is further within the scope of the present invention to prepare slightly or moderately branched polyesters which have a "true melting point" not exceeding about 30°C. This is accomplished by admixing small amounts, for example from 0.1% to about 5% by weight, based on the total charge of reactants in the polyester reaction, of a triol or tetrol to the other polyester reaction ingredients comprising epsilon-caprolactone (or alternately 6-hydroxycaproic acid and its lower oligomers), a dicarboxylic acid, and at least two additional alkanediols hereinabove defined. Triols and tetrols of the type useful for this purpose are, for example, glycerol, 1,2,6-hexanetriol, trimethylolethane, trimethylolpropane, triethanolamine, pentaerythritol, alpha-methylglucoside, and the like. Trimethylolpropane is highly preferred for this purpose. Branched polyesters of this type are, for example, very useful for the manufacture of cast urethane rolls utilized in the printing industry.

The molecular weight range of the liquid polyesters obtained in the present invention can vary from about 500 to 5000 or higher, the products of the present invention being substantially terminated by primary hydroxyl groups. However, some of the terminal groups are carboxyl although it is desirable to keep the carboxyl content quite low, for example, at 5 or below, preferably at 2 or below. For polymers of this type it is oftentimes desirable to express their functional group content in terms of their hydroxyl number and/or their hydroxyl equivalent weight. Within the molecular weight range specified above, a suitable hydroxyl equivalent weight range is from 250 to about 1500, corresponding to a hydroxyl number of from 225 to about 37. Within this range, a still more highly preferred hydroxyl equivalent weight range, particularly for applications in urethanes is from 500 to 1400, corresponding to a hydroxyl number of from 110 to about 40.

The manufacture of the polyesters may be conducted in the presence or absence of a catalyst. If it is desirable to utilize a catalyst, conventional polyesterification and ester interchange catalysts may be employed in quantities from as low as 5 parts per million or lower, to as high as 0.3% by weight or higher, based upon the weight of the polyester reactants. A preferred range is from 5 to 100 parts per million, based upon the total reactant amounts. Typical catalysts which are eminently suitable for conducting this process are tetraalkyl titanates such as tetraisopropyl and tetrabutyl titanate, stannous acylates such as stannous octoate and stannous oleate, lead acylates such as lead 2-ethylhexoate, boron trifluoride, trifluoracetic acid and many other compounds known to catalyze polyesterification reactions. It is further within the scope of the invention to perform the polycondensation reaction in the absence of a catalyst as it may be desirable in certain applications to have a polyester free of metal contaminants.

The polyesterification reaction may be conducted at a temperature range of from 100°C. to about 300°C., preferably from 100°C. to about 250°C. for periods sufficient to lower the carboxyl value to 5 or less, preferably to 2 or less. Reaction times of a few hours to as much as 48 hours are normally sufficient to accomplish suitable reduction of the acid number. The reaction is preferably conducted under an inert atmosphere such as nitrogen, methane, etc., to avoid discoloration of the resulting products.

By-product water of condensation can be conveniently removed by distillation under normal pressure, or under reduced pressure. Reduced pressure is often desirable to remove small amounts of water toward the end of the reaction. The pressure is conveniently reduced to a range of 20 mm Hg or less. It is also within the scope of the invention to remove water of condensation by means of azeotropic distillation with solvents such as benzene, toluene, ethylbenzene, xylene, etc. After completion of the azeotropic distillation, the solvent is removed via distillation and the reactants are then subjected to reduced pressure to remove substantially all volatiles and additional small quantities of water if necessary.

In order to reach the desired hydroxyl value of the novel liquid polyester products, a small excess of the glycols, usually in the range of 5 to 20% excess over the calculated amount, is charged in order to compensate for their losses during the distillation step. The exact amount of the glycol excess depends upon many process variables such as type and design of reaction equipment, reaction temperature, amount and type of solvent employed if any, pressure employed, etc. Therefore, it is preferable to establish the required glycol excess in actual plant runs.

It is further within the scope of this invention to convert the hydroxyl-terminated liquid polyester products of the present invention to the corresponding acyl derivatives, preferably by reacting with an acyl anhydride, such as acetic anhydride, particularly when the product is to be utilized as a plasticizer for vinyl resins. This reaction is preferably conducted with a several-fold excess of the anhydride in reference to the hydroxyl groups to be acylated and the mixture is heated from 100° to 150°C. for several hours. Excess anhydride and free acid generated during this reaction are then removed by distillation at 100° to 150°C., preferably under reduced pressure to remove substantially all volatiles. The acylated liquid polyesters are eminently suitable as plasticizers for vinyl resins.

PREPARATION OF POLYURETHANES

The above-described polyesters are eminently suited as reactants in the preparation of solid and microcellular urethane elastomers which exhibit novel and advantageous properties. In this aspect of the invention, the polyesters, prepared as above and containing about 25% by weight to about 70% by weight of the epsilon-oxycaproyl unit, are reacted with an organic diisocyanate and optionally a chain extender and/or a branching agent.

The liquid polyester products to be used in this aspect are fully described hereinabove.

The organic polyisocyanates which are useful for the purpose of conducting this aspect of the present invention include by way of example, 2,4- and 2,6-toluene diisocyanate and mixtures thereof, diphenylmethane diisocyanates in particular 4,4'-diphenylmethane diisocyanate or product mixtures containing a high percentage by weight of this isomer, 4,4'-biphenylene diisocyanate, 1,5-naphthylene diisocyanate, 3,3'-dimethyl-4,4'-biphenylene diisocyanate, 3,3'-dimethoxy-4,4'-biphenylene diisocyanate, hexamethylene diisocyanate, m- and p-xylylene diisocyanate or mixtures thereof, and the like. Organic polyisocyanates of this type are well known in the art and need not be further described here.

The reaction of the polyester with the organic polyisocyanate and optionally a chain extender, may be conducted in a known manner by either the so-called "one-shot" technique or by use of the "pre-polymer" technique.

A preferred embodiment of the invention however comprises reacting the liquid polyester, the organic polyisocyanate and the chain-extender simultaneously by the so-called "one-shot" technique, well-known in the art, whereby the ingredients are mixed simultaneously at a temperature from 20°C. upwards and cast into a cavity or mold, where the resulting solid or microcellular elastomer is cured until it can be demolded, thereafter being further cured at temperatures from room temperature to 150°C. or higher until near optimum physical characteristics are achieved.

As pointed out however, the novel liquid polyester products of the present invention may be converted to a "prepolymer" by reacting said liquid polyesters with an excess of the above-described isocyanates at a temperature of from 20°C. to 150°C. or higher, preferably at a temperature from 60°C. to 120°C., before extending the resulting prepolymer with a chain-extender.

Any suitable known chain-extender can be used in the process. Water, however, is the preferred chain-extender in the manufacture of the microcellular urethane elastomers in the density range of about 20 lbs/cu. ft. or somewhat lower to about 50 lbs/cu. ft. or somewhat higher. Water supplies the carbon dioxide for the foaming of the ingredients by reaction with organic polyisocyanate. It is also within the scope of the invention to utilize low-boiling liquids, for example, low boiling fluorocarbons for the purpose of expanding the microcellular elastomers, either alone or in combination with water.

It is further within the scope of the present invention to utilize any of the other chain-extenders, namely, glycols and higher polyols, amino alcohols, and diamines in conjunction with water or a low-boiling liquid such as a fluorocarbon, or by both techniques combined, in the formation of the microcellular urethane elastomers. Preferred chain-extenders for this purpose are glycols such as diethylene glycol, 1,4-butanediol, 1,6-hexanediol and the like and triols such as triethanolamine, trimethylolpropane, and the like.

Glycols and higher polyols are useful chain-extenders for preparation of the microcellular elastomers described hereinabove as well as for the manufacture of the solid urethane elastomer products of the present invention. The solid urethane elastomers may be thermoset solid casting resins or they may be essentially linear polymers still capable of being extruded, calandered, or injection-molded. They are known in the trade as "urethane elastomer granules".

These glycols may be utilized alone or in combination with higher polyols, for example, triols, tetrols and hexols. Combinations of glycols and higher polyols are particularly useful in the manufacture of thermoset solid casting resins; however, small amounts of triols may also be desirable in the manufacture of "urethane elastomer granules".

Among the glycol and higher polyol chain-extenders that are particularly useful for the manufacture of the urethane elastomers of the present invention are, by way of example, diethylene glycol, 1,4-butanediol, 1,5-pentanediol, 1,6-hexanediol, quinitol, bis-(2-hydroxyethyl) hydroquinone, p-xylylenediol, reaction products of diamines and epsilon-caprolactone, triethanolamine, triisopropanolamine, trimethylolethane, trimethylolpropane, 1,2,6-hexanetriol, alpha-methylglucoside, sorbitol, and the like. It is further within the scope of the present invention to utilize low molecular weight alkylene oxide adducts, for example ethylene oxide or propylene oxide adducts, of the above-mentioned triols, tetrols and hexols as the polyfunctional chain-extension agent, provided that the molecular weight of such products is lower than about 1000. Further, included within the scope of the invention are alkylene oxide adduct extenders of ethylenediamine and diethylenetriamine, for example, tetrakis-2-hydroxypropyl ethylenediamine, and the like.

Amino alcohols that are particularly useful as chain extenders for the manufacture of urethane elastomers of the present invention are, by way of example, ethanolamine, paraamino-phenethyl alcohol, para-amino-alpha-methylbenzyl alcohol, 4-aminocyclohexanol, diethanolamine, 2-amino-2-(hydroxymethyl)-1,3-propanediol, and the like. Difunctional amino alcohols of this type are preferred.

Diamines that are particularly useful for the manufacture of urethane elastomers of the present invention are, by way of example, particularly the slow reacting halogen-containing amines such as 4,4'-methylenebis-(2-chloroaniline), and 3,3'-dichloro-4,4'-biphenylenediamine. When the reactions are conducted in strongly polar solvents such as dimethyl sulfoxide and dimethyl formamide, fast reacting amines like hydrazine, ethylenediamine, 1,6-hexanediamine, p-xylylenediamine, 2,4- and 2,4-toluenediamines, piperazine, 4,4'-methylenebis (aniline), benzidine, and the like may also be utilized. The use of fast reacting diamines may also be desirable in spray applications or other specialized use areas. The above-mentioned chlorine-containing diamines are highly preferred however.

In the manufacture of the microcellular and solid urethane elastomers of the present invention, for each equivalent of the polyester there is employed from 0.5 or less to as much as 4 to 5 equivalents or more of the chain-extender comprising of water, glycols or higher polyols, amino alcohols, diamines or mixtures of two or more of the chain-extenders. The structure and the amount of the chain-extender have a very pronounced effect upon the hardness of the resulting urethane elastomers as well as upon many other physical characteristics. Generally speaking, an increase in the amount of chain-extender utilized results in a pronounced increase in hardness, whereas at the lower chain-extender limits, namely, from 0.5 to about 2.5 equivalents of chain-extender per equivalent of polyester, the resulting polyurethane is quite elastomeric. At the higher chain-extender concentrations the resulting polyurethane may assume more and more the behavior of a plastic.

The amount of organic polyisocyanate utilized, whether by the two-step prepolymer process or by the one-step so-called "one-shot" process, can be expressed generally by the following formula:

$$\text{Isocyanate Index} = \frac{\text{Factor F} \times \text{Theoretical NCO equivalents}}{\text{Sum total equivalents of reactive sites of polyester and extender}}$$

In explanation of this formula, it is pointed out that the reactive sites of the polyester and extender include the hydroxyl groups, carboxyl groups, amino groups (if any present), and water (microcellular elastomers). The theoretical NCO equivalents are calculated from the reactive sites cited hereinabove. The factor F indicates how much NCO excess or NCO deficiency is utilized for manufacture of the article. When the factor F is 1, the reaction is essentially stoichiometric; when it is less than 1, there exists an NCO deficiency; if it is more than 1, there exists an NCO excess. For the purposes of the present invention, the isocyanate index (or also the factor F) may vary from 0.7 to about 1.3, with the preferred range being from 1 to 1.15. However, there exist exceptions to this rule: for example, in the case of cast rollers for the printing industry, the preferred range is from 0.75 to 0.95.

In the prepolymer process, the isocyanate and the polyester are reacted at a temperature of from room temperature to 150°C., preferably at a temperature of from 60°C. to about 120°C. to form the prepolymer. The prepolymer is then reacted with the chain-extender at temperatures from room temperature to 150°C. or higher, preferably at temperatures from 60°C. to 120°C.

In the one-shot process, temperature ranges can be the same as in the prepolymer process; however, there exists the decided advantage in being able to conduct the reaction sequence at generally lower temperature than in the prepolymer process.

The reslting novel elastomeric products, after casting or molding, are subjected to a final cure which may be from several weeks at room temperature to a few hours or less at 150°C. or higher.

As pointed out above, branching agents may also be included as reactants in the process. These branching agents are known in the urethane art and comprise generally the triols or tetrols discussed in the polyester section. However, where these branching agents are utilized in preparing the polyester, they are generally not employed in preparing the polyurethane. Hence, they may be used in either step.

It is also within the scope of the invention to employ other materials normally used in the production of polyurethanes. Thus suitable catalysts may be used such as metallic catalysts and tertiary amine catalysts. Among the metallic catalysts which may be used and which are known in the art, are compounds of tin, lead, titanium, antimony, zinc, cobalt, iron, bismuth, copper and the like. Preferred metallic catalysts are tin compounds including stannous octoate, stannous oleate, dibutyltin di-2-ethyl hexoate, dibutyltin dilaurate, and the like.

The many tertiary amine catalysts which are useful for the purpose of the present invention include by way of example, N-methyl and N-ethyl morpholine, N-coco morpholine, N,N-dimethyl fatty alkyl amines such as Armeen DM-16 D and the like manufactured by Armour Industrial Chemicals, dimethylbenzylamine, 1-methyl-4-dimethylaminoethylpiperazine, N,N'-dimethylpiperazine, N-methyldiethanolamine, triethanolamine, tetrakis-N-2-hydroxypropylethylenediamine, triethylenediamine, 2,2'-oxybis(N,N-dimethylethylamine), N,N,N'N'-tetramethyl-1,3-butanediamine, 1,1,3,3-tetramethylguanidine and the like. Preferred tertiary amines are N-methyl and N-ethylmorpholine, N-coco morpholine, Armeen DM-16 D, and dimethylbenzylamine.

One or more tertiary amines may be utilized in combination with a metallic catalyst, for example, a tin catalyst like stannous octoate, in providing a properly balanced promotion of the isocyanate-polyester and isocyanate-water reaction.

In addition, other materials, commonly used in the polyurethane art, may be employed in the processes of the invention provided they are not deleterious thereto.

As discussed above, the basic components used in the production of the urethanes of the present invention are (a) the liquid polyesters, (b) the organic polyisocyanates, (c) the chain-extenders and/or (d) branching agents. However, it is clear that other additives, such as dyes and pigments, plasticizers, flame-proofing agents, cell-size regulators (surfactants), fillers, and other modifiers may be used for the production of special products. Additives of this type are well known in the art.

The following examples are presented to illustrate the invention but are not considered as limitative thereon.

In the following examples, parts are by weight unless otherwise indicated.

EXAMPLE I

This example illustrates the preparation of a cast polyurethane elastomer from a 2000 molecular weight copolyesterdiol, said diol containing, by weight, 65 percent 6-hydroxycaproic acid residues and 35 percent of the residues obtained by employing adipic acid and an equimolar mixture of ethylene glycol and 1,4-butanediol in the theoretically required proportions. The copolyesterdiol has a melting point of 28 – 29° C.

A. Ester Preparation

To a 12-liter Pyrex flask equipped with agitator, thermometer, nitrogen inlet, heating mantle and Dean-Stark trap, was charged 8550 grams of crude 6-hydroxycaproic acid, which had been prepared by hydrolysis of epsilon-caprolactone with 5 times the theoretical amount of water in the presence of Amberlite IR-120H sulfonic acid resin catalyst as further described in our copending U.S. patent application Ser. No. 715,139. There were further charged 2440 grams of adipic acid, and 1650 grams of an equimolar mixture of ethylene glycol and 1,4-butanediol. The temperature of the reaction mixture was increased to 230° C. while distilling off water through a 300 mm. fractionating column packed with glass helices. The pressure was reduced as necessary to maintain steady distillation of water. After most of the water had been collected, 0.03 gram of tetraisopropyl titanate catalyst was added and the reaction was continued at 240°– 250° C. until a low acid number was obtained. The total reaction time was about 20 hours. The resulting copolyesterdiol did not crystallize for several weeks at room temperature. It was found to have a hydroxyl number of 54.35 and an acid number of 0.97.

B. Polyurethane Preparation

A total of 206.45 grams of the above-described copolyesterdiol was charged to a 500 ml Pyrex resin pot equipped with thermometer, agitator, heating mantle and vacuum connection. The agitator was started and the pressure in the flask was gradually reduced to 2 mm Hg while the temperature was increased to 90° C. The polyester was dehydrated and degassed at this temperature for a period of 30 minutes. The vacuum was then released and 82 grams of 4,4'-diphenylmethane diisocyanate was added. The mixture was stirred at atmospheric pressure until the diisocyanate had dissolved completely; then the pressure was again reduced to 2 mm Hg and the temperature was increased to 110° C., and these conditions were maintained for 30 minutes.

The above prepolymer next was heated to 120° C. and the pressure was returned to atmospheric. With good agitation, 18.84 grams of anhydrous 1,4-butanediol were added and the heating mantle was removed. During the ensuing exotherm which carried the reaction mixture above 140° C., the ingredients were quickly degassed by applying a vacuum. After about 1.5 minutes the vacuum was broken and the clear, bubble-free liquid was then poured into two 6 × 6 × 0.08 inch closing molds which had been preheated to 130° C. The molds were heated in a press for 1 hour at 130° C., then removed, allowed to cool for 15 minutes, opened, and the specimens removed. The specimens were further cured at 100° C. for 20 hours.

After cooling to room temperature, the resulting polyurethane exhibited good resiliency and was very abrasion-resistant. After two weeks ageing at room temperature it exhibited the following physical properties:

| Property | Value | ASTM Test Method |
|---|---|---|
| Hardness, Shore A | 85 | D 1484-59 |
| Ultimate Tensile Strength, psi. | 5800 | D 412-61 T |
| Ultimate Elongation, % | 800 | D 412-61 T |
| 100% Tensile Modulus, psi. | 780 | D 412-61 T |

| Property | Value | ASTM Test Method |
|---|---|---|
| 300% Tensile Modulus, psi. | 1350 | D 412-61 T |
| Tear Strength, Die C, pli. | 510 | D 624-54 |

EXAMPLE II

This example describes the synthesis of liquid and/or low melting copolyesterdiols containing increasing amounts of the epsilon-oxycaproyl unit, said unit being derived from epsilon-caprolactone (Copolyesterdiol products B, C, D and E). The hydrolytic stability of these products is compared with the hydrolytic stability of two typical prior art polyester products, one being a copolymer of adipic acid, ethylene glycol and 1,4-butanediol (Product A), the other being a commercially available polyepsilon-caprolactonediol having a very high epsilon-oxycaproyl content ("Niax" Polyol D-560, Union Carbide Corporation).

Copolyesterdiol A (Product A)

To a 5-liter flask equipped agitator, thermometer, nitrogen ebulator, a 30 cm distillation column packed with glass rings and fitted with reflux condenser and vacuum distillation head, there were charged 2718 grams of adipic acid, 919 grams of 1,4-butanediol and 658 grams of ethylene glycol. The reactants were upheated to 210°C. during a period of 5.5 hours during which time a total of 600 grams of water were distilled off. Upon measurement, the acid number was found to be 23.9. The reactants were now heated under a vacuum of 1–2 mm Hg first for 3 hours at a pot temperature of 140° – 210° C., and subsequently for 9 hours at 235° – 240° C. while the column was operated under steady glycol reflux but in a manner which prevented any significant escape of glycol.

After cooling, the polyester was found to have a hydroxyl number of 54.2 and a carboxyl number of 1.4. The polyester had a melting point of 21° – 22° C.

This portion of the example thus illustrates the synthesis of a typical, low-melting polyester of the prior art, which is however deficient from the point of view of hydrolytic stability as will be demonstrated hereinafter.

Copolyesterdiol B (Product B):

To a 5-liter flask equipped as described under Product A, there were charged 462.5 grams of epsilon-caprolactone, 2430 grams of adipic acid, 833 grams of 1,4-butanediol, and 581 grams of ethylene glycol. The reactants were upheated to 225° C. over a period of 8 hours during which time a total of 590 grams of aqueous distillate was collected. After further heating for 12 hours under a vacuum of 1 – 2 mm Hg at 230°– 240° C., the acid number was reduced to 3.5. At this point a total of 0.04 grams of stannous octoate catalyst in 13 grams of ethylene glycol was added and the reactants were further heated under a vacuum of 1–2 mm Hg at a temperature of 225°– 240° C. for a period of 3.5 hours.

Upon cooling, the resulting copolyesterdiol was found to have a hydroxyl number of 53.3 and an acid number of 1.7. It melted at 17°– 18° C. The product contains about 12.5 percent by weight of the epsilon-oxycaproyl unit.

Copolyesterdiol C (Product C)

To a 5-liter flask equipped as described under Product A, there were charged 925 grams of epsilon-caprolactone, 2067.5 grams of adipic acid, 726 grams of 1,4-butanediol, and 506 grams of ethylene glycol. The reactants were upheated to a temperature of 240° C. during a period of 8 hours during which time a total of 502 grams of aqueous distillate was collected. At this point, 0.04 gram of stannous octoate catalyst was added and the reactants were further heated at 180°–250° C. for a period of 13 hours under a vacuum of 2 mm Hg. The resulting polyester exhibited a hydroxyl number of 48.2 and a carboxyl number of 1.94. The product contains about 25 percent by weight of the epsilonoxycaproyl unit and melts at a temperature of 17°–18° C.

Copolyesterdiol D (Product D)

To a 5-liter flask equipped as described under Product A, there were charged 1980 grams of epsilon-caprolactone, 727 grams of adipic acid, 449 grams of 1,4-butanediol, and 420 grams of ethylene glycol. The reactants were upheated to 240°C. for a period of 8 hours during which time a total of 175 grams of aqueous distillate was collected. At this point, 0.04 grams of stannous octoate catalyst was added and the reactants were further heated at 230°–250°C. for a period of 8 hours under a vacuum of about 2 mm Hg. The resulting polyester exhibited a hydroxyl number of 53.8 and an acid number of 1.35. The product contains about 66% by weight of the epsilon-oxycaproyl unit and melts at 29°–30°C. It remains liquid at room temperature for at least about 1 month.

Copolyesterdiol E (Product E)

To a 5-liter flask equipped as described under Product A, there were charged 3000 grams of epsilon-caprolactone, 666 grams of adipic acid, 297 grams of 1,4-butanediol, and 213 grams of ethylene glycol. The reactants were upheated under atmospheric pressure to 225°C. for 3.45 hours while water of distillation was collected. They were further heated for a period of 9.5 hours between 180° to 240°C., while the pressure was gradually reduced to 3 – 4 mm Hg which resulted in a steady reflux on the column. At this time, the acid number had been reduced to 2.65. At this point, 0.04 grams of stannous octoate catalyst was added and the reactants were further heated at 220°–240°C. under a vacuum of about 6 mm Hg for a period of 5 hours. After this time, the copolyesterdiol had a hydroxyl number of 55.1, and an acid number of 0.3. The resulting product contained about 75 % by weight of the epsilon-oxycaproyl unit and has a melting point of 31°–32°C. The product crystallized within a few days at room temperature.

Accordingly, as shown by Products D and E, a 70 percent by weight epsilon-caproyl content is approximately the upper limit at which the copolyesterdiol products remain liquid at room temperature for long enough time periods to facilitate subsequent handling and processing of these materials, for example especially in the manufacture of "one-shot" microcellular elastomers.

In order to assess the relative stability of the above copolyesterdiol products, a factor which is of steadily increasing importance due to the introduction of polyurethanes into the automotive and textile industries, and in other areas where relatively high temperatures and humidity is encountered, they were subjected to a hydrolysis-saponification screening test in order to determine the relative stability towards humid environments for these products.

For this purpose, a 10 gram sample of the polyester product tested was added to a 500 ml. reaction flask equipped with agitator, thermometer, and reflux condenser. The test was conducted under nitrogen atmosphere. To the flask were added 200 ml. of distilled water, 50 ml. of 0.5 N NaOH and 2 ml. of a 1% solution of phenolphthalein in distilled water. The resulting aqueous phase showed the typical pink color of the indicator. The reactants were then heated to 60°C. and the polyester dispersions were agitated at constant speed until the pink color of the indicator disappeared, indicating that the base had been neutralized by the hydrolyzed fragments of the polyester. The number of hours required for disappearance of the base were noted. Table I demonstrates the results observed,

TABLE 1

HYDROLYSIS-SAPONIFICATION OF POLYESTERS

| Polyester | Hours, Color Disappearance | Epsilon-Oxycarpropyl, Wt. % |
|---|---|---|
| Copolyesterdiol A | 36.5 | 0 |
| Copolyesterdiol B | 67 | 12.5 |
| Copolyesterdiol C | 127.5 | 25 |
| Copolyesterdiol D | 370 | 66 |
| Copolyesterdiol E | 480 | 75 |
| "Niax" Polyol D-560 | over 550 | 95 |

The composition of Copolyesterdiol A utilized in the above experiment is similar to that of the commercial product "Desmophen" 2001 (Farbenfabriken Bayer). This low melting polyol serves as a starting material for urethane elastomers which have little tendency for crystallization and they have improved low temperature performance as compared with polyethylene adipates (m.p. polyester 50°C.). With increasing amounts of epsilon-oxycaproyl, the hydrolytic stability of the polyester products increases steadily and reaches an optimum at the composition of the commercial product "Niax" Polyol D-560. However, due to the high melting point of this polyester, approximately 60°C. and its strong tendency to crystallize rapidly, only certain of its urethane compositions may be obtained in the non-crystalline state which is required for good elastomeric behavior. For example, at hardness ranges of 70 Shore A and lower, such products invariably crystallize at lower temperature and then remain even crystalline at room temperature. Also, at the higher hardness ranges they have a much more severe tendency to crystallize than products derived from the low-melting copolyesterdiols of the present invention.

For the above reasons, namely improved hydrolytic stability of the polyester product and the corresponding urethanes and tendency of crystallization at too high an epsilonoxycaproyl content, the limits of the epsilon-oxycaproyl content for the copolyesterdiol products of the present invention have been set at from about 25% by weight to abot 70% by weight.

It has further been observed that liquid polyesters containing the highest epsilon-oxycaproyl content which is highly desirable for optimized hydrolytic stability may be obtained by proper selection of at least two glycols from the group comprising ethylene glycol, 1,3-propanediol, 1,4-butanediol, and 1,5-pentanediol.

As will be shown hereinafter, 1,6-hexanediol for example, even when utilized in combination with another glycol, yields higher melting polyesters which crystallize readily at room temperature.

It has further been observed that for the synthesis of epsilon-oxycaproyl-containing copolyesterdiols of optimized hydrolytic stability, the use of a polyesteresterfication and/or ester interchange catalyst during their preparation is highly desirable. Such observation was not the case with products containing no epsilon-oxycaproyl. It is likely that at the high temperatures required for the preparation of copolyesterdiols, the epsilon-caprolactone and/or its lower cyclic oligomers are in equilibrium with the linear polymer. Hence, the presence of excessive amounts of such monomeric components appear to have a deleterious effect upon the hydrolytic stability of the corresponding polymer.

The hydrolytic stability trends observed with the above polyester types are observed as well with the corresponding polyurethanes by means of following the decrease in modulus or the ultimate tensile strength upon subjecting the elastomers to water or water vapors at elevated temperatures.

EXAMPLE III

To a 2-liter flask equipped as described in Example II (Product A) there were charged 831.6 grams of epsiloncaprolactone, 376 grams of adipic acid, 170 grams of 1,5-pentanediol and 111 grams of ethylene glycol. Upon heating of the reactants up to a temperature of 250°C. for a period of 11 hours, a total of 225 grams of aqueous phase had been collected and the acid number was found to be 3.6. Upon further heating at 235°–240°C. at 1 mm Hg for a period of 5 hours, the hydroxyl number of the resulting copolyesterdiol was found to be 53.2, and the acid number 1.44. The product (Product F) remained liquid at room temperature and exhibited a melting point of 22°–23°C. The material contains about 60% by weight of the epsilon-oxycaproyl unit.

EXAMPLE IV

The prior art describes the preparation of low-melting copolyesterdiols from a dicarboxylic acid and two or more glycols. However, as has also been demonstrated in Example II (Product A), products of this type are inferior with regard to hydrolytic stability. The prior art also describes the manufacture of low-melting polyesters from epsilon-caprolactone, a dicarboxylic acid and branched glycols. Such products (see for example Product I of present example) give urethanes of good hydrolytic stability, but introduction of branching and/or secondary hydroxyl end-groups results evidently in reduced mechanical properties as has been discussed in the prior art.

In order to achieve a combination of good processability of the polyester, good mechanical performance and low temperature properties of the corresponding urethane, yet maintain high hydrolytic stability, it has been found during the course of this invention that this may be best achieved by copolymerizing epsilon-caprolactone (or 6-hydroxycaproic acid and oligomers), a dicarboxylic acid, and at least two diprimary glycols selected from the group consisting of $HO(CH_2)_nOH$, wherein n=2–5. Surprisingly, as will be demonstrated in this example (Product G), 1,6-hexanediol does not yield polyesters of low melting point at high epsilon-oxycaproyl contents even when utilized in conjunction with a second glycol. Therefore, the useful glycols are limited to where n=2–5. Moreover, as will be demonstrated in the case of Product H (this example), the use of only one glycol definitely yields polyester products which are higher melting and crystallize rapidly. The synthesis of products G, H, and I is described hereinafter.

Copolyesterdiol G (Product G):

In the manner described in Example II (Product A), 2400 grams of epsilon-caprolactone, 1036 grams of adipic acid, 310 grams of ethylene glycol, and 537 grams of 1,6-hexanediol were converted to a copolyesterdiol. The resulting product had a hydroxyl number of 59.4, a carboxyl number of 0.96, and a melting point of 31°–32°C. Although the copolymer contains only about 60 percent by weight of epsilon-oxycaproyl it crystallizes within 24 hours at room temperature, making it considerably less desirable for the purposes of the present invention. Hence, 1,6-hexanediol is not satisfactory for preparation of the liquid polyesters.

Copolyesterdiol H (Product H)

Under the above-described conditions, there were reacted 6600 grams of epsilon-caprolactone, 2160 grams of adipic acid, and 1775 grams of 1,4-butanediol at a temperature upwards of about 230°C. The resulting polyester crystallized immediately upon cooling to room temperature. It was shown to possess a melting point of 35°–36°C., contained 65 percent by weight of the epsilon-oxycaproyl unit, and exhibited a hydroxyl number of 50.85 and an acid number of 1.3. It is therefore much less desirable for the applications contemplated in this invention than the copolyesterdiol products comprising two glycols as further specified hereinabove.

Copolyesterdiol I (Product I)

Still usin the above-described conditions, there were reacted 3000 grams of epsilon-caprolactone, 597 grams of adipic acid, and 587 grams of 1,3-butylene glycol in the presence of 0.08 gram of tetraisopropyl titanate catalyst. The resulting polyester had a hydroxyl number of 54.2, an acid number of 0.93, a melting point of 21°–22°C., and an epsilon-oxycaproyl content of 75 percent by weight. Although this alkyl-substituted product contains a desirably high epsilon-oxycaproyl content and is low-melting, elastomers derived therefrom do not exhibit the excellent strength characteristics of the products of the present invention (see Example 5).

Table II further illustrates the melting points of the various polyester products prepared in Example IV hereinabove. It further makes note of their tendency to crystallize upon exposure for many weeks at room temperature.

TABLE II
MELTING POINTS OF POLYESTERS

| Polyester | Composition | Epsilon-Oxycaproyl, Wt.% | Melting Point, °C. | Remarks |
|---|---|---|---|---|
| Example I | HCA[1], AA[2], EG[3], BD[4] | 60 | 28–29 | Remains liquid |
| Product A (Ex. II) | AA, EG, BD | 0 | 21–22 | Remains liquid |
| Product B (Ex. II) | CL[5], AA, EG, BD | 12.5 | 17–18 | Remains liquid |
| Product C (Ex. II) | CL, AA, EG, BD | 25 | 17–18 | Remains liquid |
| Product D (Ex. II) | CL, AA, EG, BD | 67 | 29–30 | Remains liquid |
| Product E (Ex. II) | CL, AA, EG, BD | 75 | 31–32 | Crystallizes |
| Product F (Ex. III) | CL, AA, EG, PD[6] | 60 | 22–23 | Remains liquid |
| Product G (Ex. IV) | CL, AA, EG, HD[7] | 60 | 31–32 | Crystallizes |
| Product H (Ex. IV) | CL, AA, BD | 65 | 35–36 | Crystallizes |
| Product I (Ex. IV) | CL, AA, BG[8] | 75 | 21–22 | Remains liquid |

Footnotes:
[1] HCA = 6-Hydroxycaproic acid and oligomers
[2] AA = Adipic acid
[3] EG = Ethylene glycol
[4] BD = 1,4-Butanediol
[5] CL = ε-Caprolactone
[6] PD = 1,5-Pentanediol
[7] HD = 1,6-Hexanediol
[8] BG = 1,3-Butylene glycol

EXAMPLE V

A series of cast urethane elastomers were prepared from most of the polyester products described in Examples II – IV. For this purpose there were reacted 0.200 equivalents of the polyester, 0.639 equivalents of 4,4'-diphenylmethane diisocyanate, and 0.418 equivalents of anhydrous 1,4-butanediol.

Approximately 200 grams of the polyester was charged to a 500 ml. resin flask, the polyester was degassed and dehydrated at 90°C. and 1 – 2 mm Hg for 30 minutes. The solid diisocyanate was added at this temperature and after it dissoled, the reactants were upheated to 90°C. for 15 minutes. Upon application of 1 – 2 mm Hg, the resulting prepolymer was then heated to 120°C., the vacuum was broken and the 1,4-butanediol was added with good agitation. The resulting exothermic reaction reached 140° –150°C. within 1.5 – 2 minutes, while the system was still held under the above vacuum to remove all air and other gases. At this time, the vacuum was broken and the materials were cast quickly into two 6 × 6 × 0.08 inch sample molds which had been preheated to 120°C. The molds were placed in a heated press and the materials were cured for 1 hour at 120° C. whereupon the molds removed, remoed, allowed to cool for 5 minutes and the specimens were removed from the mold.

The specimens were further heated for 16 hours at 100°C. in an oven. All samples were tested after remaining at least two weeks at room temperature. The following results were observed (Table III).

TABLE III

PHYSICAL CHARACTERISTICS OF ELASTOMERS

| Polyester Product | Hardness, Shore A | Tensile Strength, psi. | Elongation, % | 100% Modulus, psi. | 300% Modulus, psi. | Tear Strength Die C, pli. |
|---|---|---|---|---|---|---|
| Product A (Ex. II) | 85 | 5870 | 700 | 870 | 1250 | 501 |
| Product B (Ex. II) | 81 | 5940 | 675 | 730 | 1250 | 503 |
| Product C (Ex. II) | 79 | 5850 | 750 | 640 | 1050 | 470 |
| Product D (Ex. II) | 82 | 7400 | 575 | 810 | 1600 | 525 |
| Product E (Ex. II) | 82 | 7370 | 550 | 740 | 1420 | 470 |
| Product F (Ex. III) | 82 | 7300 | 700 | 700 | 1250 | 510 |
| Product I (Ex. IV) | 81 | 4780 | 625 | 780 | 1390 | 440 |

The above Table III thus demonstrates clearly that the elastomers derived from the copolyesterdiols of the present invention (Products C, D and F) are superior in most respects to the elastomers prepared from liquid copolyesterdiols of the prior art (Products A and I). Moreover, it has been observed that the hydrolytic stability of Products C, D and F is appreciably superior to Product A.

EXAMPLE IV

This example illustrates the formation of a high hardness urethane elastomer from a copolyesterdiol product of the present invention by the prepolymer technique. By processes well-known in the prior art, similar resins suitable for injection-molding or extrusion may be prepared by the "one-shot" technique.

A total of 160 grams of the copolyesterdiol described in Example III (Product F) was dehydrated and degassed at 90°C. for 30 minutes and then reacted with 94 grams of 4,4'-diphenylmethane diisocyanate. After the prepolymer was properly degassed and heated to 120°C., 94 grams of molten "Multrathane"-XA chain-extender (Mobay Chemical Company, [bis-(2-hydroxyethyl) hydroquinone] was added, the materials were agitated for 1 minute while degassing under a pressure of 1 mm Hg, and the reacting elastomer was cast into a specimen mold and heated for 20 minutes at 190°C. The specimen was then demolded and further cured for 24 hours at 120°C. The resulting elastomer exhibited the following properties.

TABLE IV

| | |
|---|---|
| Hardness, Shore A | 96 |
| Tensile Strength, psi. | 2675 |
| Elongation, % | 475 |
| 100% Modulus, psi. | 1890 |
| 300% Modulus, psi. | 2410 |
| Tear Strength, pli. | 850 |

EXAMPLE VII

The liquid polyesters of the present invention are also admirably suited for the manufacture of micro-cellular urethane elastomers by the "one-shot" technique although they may, of course, also be converted to such products by the "prepolymer" technique.

In the "one-shot" technique, the copolyesterdiol, water and other chain-extenders if desired, catalyst and surfactant, if desired; are premixed and subsequently blended with 4,4'-diphenylmethane diisocyanate or another suitable diisocyanate. Since the polyesters of the present invention are liquid at room temperatue, the reaction is considerably moderated when the ingredients are mixed initially which results in a much better degree of process control.

This embodiment of the invention is further illustrated by means of the following experiments:

Microcellular Elastomer A

A microcellular elastomer was prepared by blending at room temperature 510 grams of the copolyesterdiol described in Example III (Product F), 27.5 grams of anhydrous 1,4-butanediol, 13.75 grams of triethanolamine, 1.65 grams of water, 0.275 gram of a 10 percent by weight, solution of T-52 N concentrate in polypropylene glycol 425 (T-52 N concentrate is a dibutyltin diacylate catalyst available from Carlisle Chemical Company), and 235 grams of "Isonate" 143-L diisocyanate (The Upjohn Company, diphenylmethane diisocyanates containing carbodiimides).

Blending was accomplished by means of a high-speed electric stirrer. The initial temperature of the blend was about 30°C. Foaming commenced within about 45 seconds. The material was transferred into a 12 inch × 12 inch × 1 inch stainless steel mold which had been treated witih a mold release agent and preheated to 70°C. The mold was closed and placed in an oven at 100°C. for 1 hour, removed, allowed to cool, and the microcellular elastomer was demolded. The resulting microcellular elastomer had a density of 18.5 lbs/cu. ft., was very tough and resilient and exhibited low compression set.

Microcellular Elastomer B

Another microcellular urethane elastomer was prepared by blending at room temperature 500 grams of the copolyesterdiol described in Example III (Product F), 6 grams of water, 0.5 grams of L-531 polysiloxanepolyoxyalkylene surfactant (Union Carbide Corporation), 1.5 gram of "DABCO" 33 LV (Houdry Process Corporation, 33 percent by weight of triethylenediamine catalyst in dipropylene glycol), and 170 grams of "Isonate" 143-L diisocyanate. The materials were allowed to expand in the above-described mold which was held as tightly as possible to avoid loss of material. After cure for 1 hour at 100°C., the microcellular elastomer was demolded. It was then further cured for 16 hours at 100°C. in an oven. The resulting microcellular elastomer had a density of 9.5 lbs/cu. ft., possessed outstanding strength and resiliency, and had low compression set. If one desires to increase the density of the product, for example, to about 25 – 40 lbs/cu. ft., the amount of water employed in the above recipe is reduced and/or the components are allowed to expand under conditions which prevent the excape of any material. This can, for example, be accomplished in tightly fitting molds designed for pressures up to 200 psi. or higher.

When the above recipe was repeated, except that "Niax" Polyol D-560 (Union Carbide Corporation)

possessing a melting point of 60°C. was utilized in place of copolyesterdiol product F, the foaming process became difficult due to the high initial temperature of the starting materials (approx. 70°C.). Moreover, it was observed that the resulting foam had low resiliency and very high permanent set. These observations can all be ascribed to the high melting point and crystallinity of the starting polyol.

The invention has been described hereinabove with reference to certain preferred embodiments thereof. However, it is to be understood that the invention is not to be limited thereto as obvious modifications thereof will be apparent to those skilled in the art.

What is claimed is:

1. Substantially primarily hydroxyl terminated linear and branched polyester polyols which remain liquid at ambient temperature prepared by the process which comprises simultaneously and substantially completely reacting:
   i. e-caprolactone, 6-hydroxycaproic acid, a lower oligomer of 6-hydroxycaproic acid or mixture of the foregoing in an amount sufficient to provide from about 25 to 70 percent by weight of the oxycaproyl unit

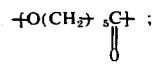

ii. at least one dicarboxylic acid or dicarboxylic acid anhydride selected from the group consisting of adipic acid, succinic acid, glutaric acid, sebacic acid, pimelic acid and azelaic acid, their anhydrides and mixtures thereof; and
   iii. at least two different glycols selected from the group consisting of ethylene glycol, 1,3-propanediol, 1,4-butanediol and 1,5-pentanediol, the molar ratio of the glycols being in the range of from about ⅓ to about 3.

2. The polyesterpolyols of claim 1 having a true melting point not exceeding about 30°C.

3. The polyesterpolyols of claim 1 formed by contacting the reactants at a temperature of about 100° to 300°C.

4. The polyesterpolyols of claim 3 formed by contacting the reactants in the presence of about 5 parts per million to about 0.3 percent of the total charge of a catalyst selected from the group consisting of polyesterification catalysts and ester interchange catalysts.

5. The polyesterpolyols of claim 1 formed by adding to the reactants from about 0.1% to 5.0% by weight of the total charge of reactants, of a polyol branching agent selected from the group consisting of glycerol, 1,2,6-hexanetriol, trimethylolethane, trimethylolpropane, triethanolamine, pentaerythritol and alphamethylglucoside.

* * * * *